United States Patent [19]

Gruett

[11] Patent Number: 4,529,514
[45] Date of Patent: Jul. 16, 1985

[54] FILTER ASSEMBLY WITH SHUT OFF AND FILTER ELEMENT THEREFOR

[75] Inventor: Donald G. Gruett, Manitowoc, Wis.

[73] Assignee: Oil-Rite Corporation, Manitowoc, Wis.

[21] Appl. No.: 562,859

[22] Filed: Dec. 19, 1983

[51] Int. Cl.³ .................... B01D 27/10; B01D 35/02; B01D 35/14

[52] U.S. Cl. .................... 210/234; 210/235; 210/429; 210/453; 210/455; 210/457; 210/497.01; 55/314; 55/379

[58] Field of Search ............. 210/232, 234, 235, 445, 210/453, 131, 483, 484, 479, 429, 323.2, 100, 455, 457, 497.01; 55/379, 314, 312

[56] References Cited

U.S. PATENT DOCUMENTS

| | | | |
|---|---|---|---|
| 1,218,848 | 3/1917 | Foster | 210/457 |
| 1,511,726 | 10/1924 | Heinze | 210/457 |
| 1,720,380 | 7/1929 | Schulze | 210/234 |
| 1,917,203 | 7/1933 | Heinz | 210/445 |
| 2,371,895 | 3/1945 | Kingman | 210/457 |
| 3,319,791 | 5/1967 | Horne | 210/234 |
| 3,633,757 | 1/1972 | Madern | 55/379 |
| 3,715,032 | 2/1973 | Nicko | 210/235 |
| 3,852,196 | 12/1974 | Szpur | 210/235 |
| 4,130,622 | 12/1978 | Pawlak | 210/497.01 |
| 4,267,039 | 5/1981 | Ryan | 210/323.2 |

FOREIGN PATENT DOCUMENTS 2494594  5/1982  Fed. Rep. of Germany ...... 210/484

*Primary Examiner*—Ernest G. Therkorn
*Attorney, Agent, or Firm*—Andrus, Sceales, Starke & Sawall

[57] ABSTRACT

A filter assembly includes a slidable tubular member which in a first position provides for flow communication from an inlet passage through a filter element to a filter chamber outlet. Upon removal of the filter housing and filter element the tubular member is biased to a second position to effect a flow shut off between the inlet passage and the tubular member. The filter assembly may further include an outlet passage in flow communication with the inlet passage, and a valve seat is axially aligned with the tubular member and disposed between the inlet passage and outlet passage. A valve member on the end of the tubular member is engageable with the valve seat to preclude flow between the inlet passage and outlet passage when the tubular member is in the first position and providing for flow communication between the inlet passage and the filter chamber outlet.

4 Claims, 9 Drawing Figures

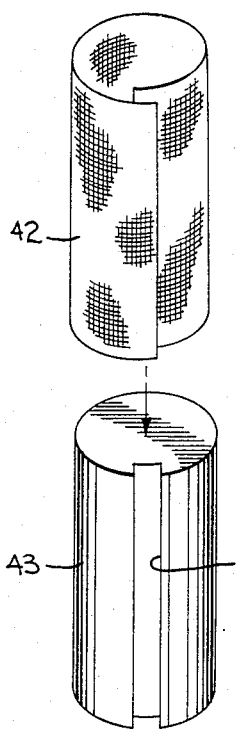
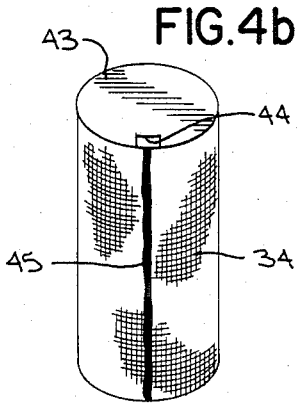
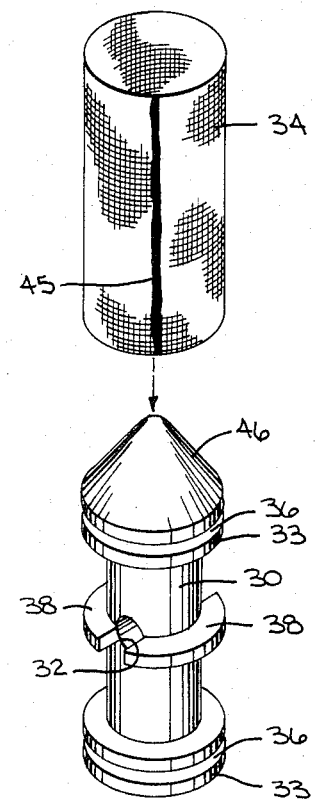
FIG.4a
FIG.4b
FIG.4c
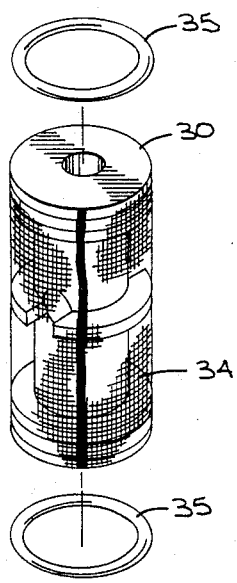
FIG.4d
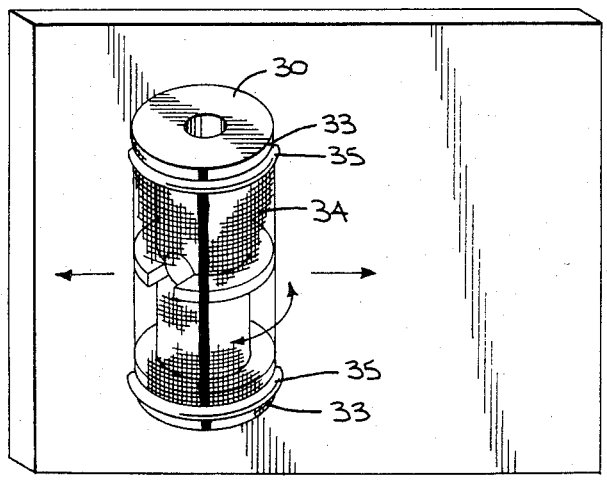
FIG.4e
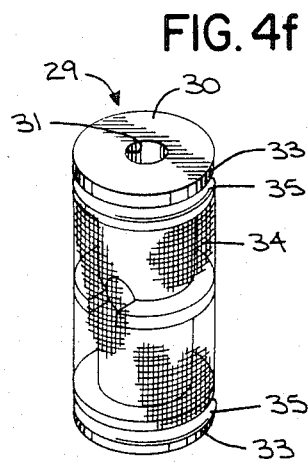
FIG.4f

FILTER ASSEMBLY WITH SHUT OFF AND FILTER ELEMENT THEREFOR

BACKGROUND OF THE INVENTION

This invention relates to a filter assembly with flow shut off and the filter element or cartridge therefor.

Oils for lubrication often carry deleterious particulate matter that can foul up machinery and/or the metering and other valves that control the flow to machinery. Filters are thus employed to remove such particulate matter. It is generally an object of this invention to not only provide such a filter assembly, but also to provide such an assembly wherein the flow is automatically shut off when the filter housing is removed to cleanse the housing and/or replace the filter element. It is a further object of the invention to provide for an alternate source of lubricant so that the machinery can keep running even during the interval of time required for cleansing the filter housing and/or replacing the filter element. And a final object of the invention resides in the construction of the filter element.

SUMMARY OF THE INVENTION

The invention resides in a filter assembly having an inlet passage. The assembly includes a removable housing that defines a filter chamber. A filter element is disposed in the chamber, and the latter is provided with an outlet. A bore extends between the inlet passage and the filter chamber. A tubular member is slidably disposed in the bore and projects into the inlet passage and the filter chamber. Closure means are provided on the end of the tubular member disposed in the inlet passage, and at least one radial orifice is provided in the tubular member adjacent to the closure means. The tubular member is slidable axially within the bore between a first position wherein the orifice is disposed in the inlet passage to place the inlet passage in flow communication with the internal passage of the tubular member and a second position wherein the orifice is disposed within and closed by the bore to shut off flow communication between the inlet passage and the tubular member. The filter element in the filter chamber is engageable with the tubular member to maintain the orifice in the first position when the filter housing is in place on the assembly to provide for flow communication from the inlet passage through the filter element to the filter chamber outlet. Spring means are provided to bias the tubular member to the second position to thus effect flow shut off upon removal of the housing and filter element from the assembly.

According to a further aspect of the invention the filter assembly includes an outlet passage in flow communication with the inlet passage. A valve seat is axially aligned with the tubular member and disposed between the inlet passage and outlet passage. The closure means on the end of the tubular member also comprises a valve member which is engageable with the valve seat to preclude flow communication between the inlet passage and outlet passage when the tubular member is disposed in the first position to place the inlet passage in flow communication with the filter chamber outlet. The valve member is removed from the valve seat to place the outlet passage in flow communication with the inlet passage when the tubular member is biased to the second position to effect shut off of flow communication between the inlet passage and the filter chamber outlet.

The filter element of this invention includes a spool-like frame member having a circumferential flange adjacent to the remote ends thereof and a bore passage extending generally axially thereof. The frame member further includes a radially extending bore passage intermediate the ends thereof and in flow communication with the axial bore passage. The flanges on the frame member are provided with a circumferentially extending recess that opens radially outward. A cylindrical screen of desired mesh is disposed on the spool-like frame member and extends generally the full length between the remote ends of the member. An O-ring is disposed outwardly of the screen and in each flange recess to secure the screen relative to the respective ends of the frame member.

BRIEF DESCRIPTION OF THE DRAWING FIGURES

The drawings furnished herewith illustrative the best mode for the invention presently contemplated and described hereinafter.

In the drawings:

FIGS. 4a through 4f illustrate the basic steps for assembling the filter element for use in the filter assembly of FIG. 1.

DESCRIPTION OF THE ILLUSTRATED EMBODIMENT

Figure 1:
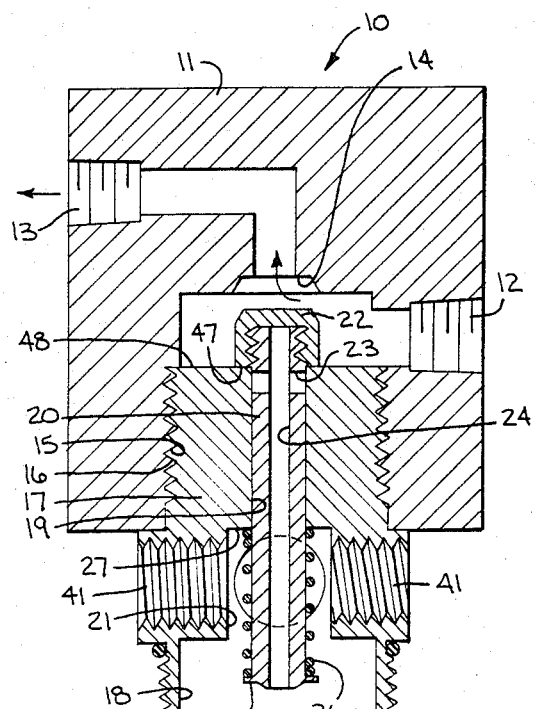
FIG. 1 is a sectional elevation view of the filter assembly of this invention.

Referring to the drawings, the filter assembly 10 of this invention is intended primarily for the removal of deleterious particulate matter from oil as may be supplied to a vacuum pump or other machine, not shown.

The filter assembly 10 generally comprises a fitting 11 which may be interposed in an oil supply line and includes an inlet passage 12 and an outlet passage 13 with a valve seat 14 disposed between the passages. Axially aligned with the valve seat 14, the fitting 11 is provided with a threaded opening 15 that intercepts with the inlet passage 12 and receives the threaded end portion 16 of the body 17.

The body 17 is provided with a stepped axial bore 18 aligned with the valve seat 14. The narrowest portion 19 of the bore 18 opens into the inlet passage 12 and slidably receives the tubular member 20 which extends beyond the ends of the bore portion 19 into the inlet passage 12 and the enlarged bore portion 21, respectively. The upper end of the tubular member 20 is closed by a cap 22 which is threaded on the end of the member. Exteriorly the cap 22 is adapted to engage within the valve seat 14 in preclude fluid flow from the inlet passage 12 to the outlet passage 13. Adjacent to and beneath the cap 22 the tubular member 20 is provided with one or more radially extendings orifices 23 to place the interior passage 24 of the tubular member in flow communication with the inlet passage 12 when the valve member cap 22 is engaged upon the valve seat 14.

Figure 2:
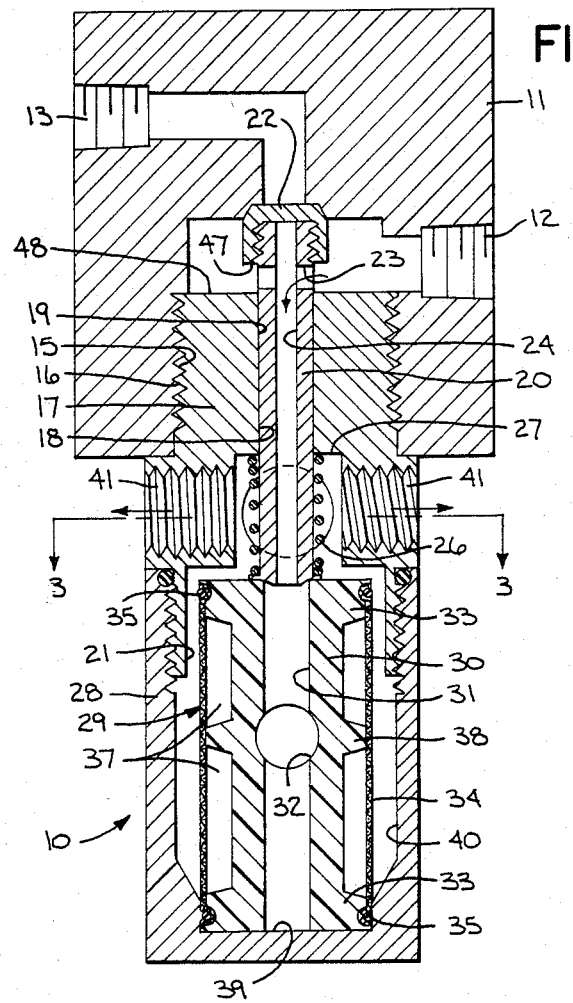
FIG. 2 is a view generally similar to that of FIG. 1 and shows the filter housing disassembled from the assembly.
Figure 3:
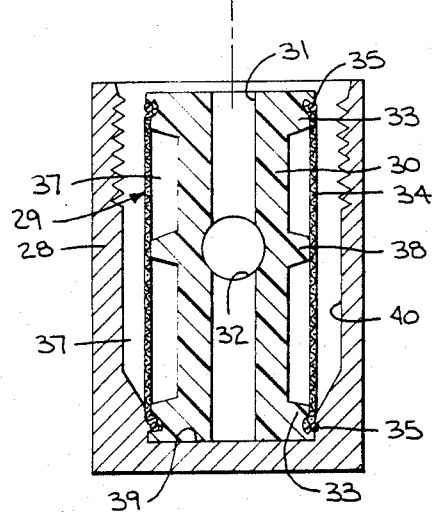
FIG. 3 is a view taken generally on line 3—3 of FIG. 1.
Figure 3:
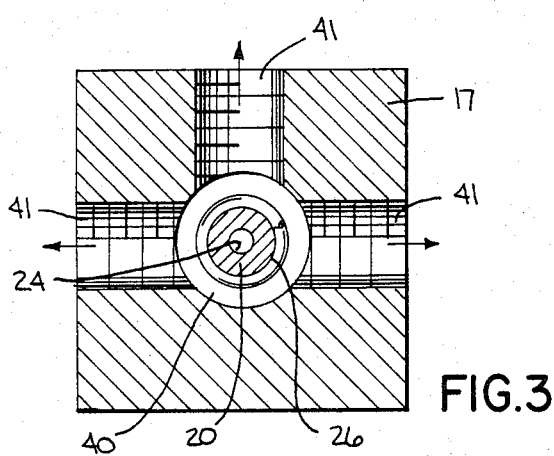

The opposite or lower end of tubular member 20 is provided exteriorly with a peripherally extending, radial flange 25, and a coil spring 25 is interposed between the flange 25 and the opposed shoulder 27 formed between the bore portions 19 and 21. The spring 26 is disposed to bias the tubular member 20 away from the valve seat 14 and effect closure of the orifices 23 within the bore portion 19 as generally shown in FIG. 2. With the tubular member 20 biased off its valve seat 14, the inlet and outlet passages 12 and 13 are placed in flow communication as also shown in FIG. 2.

A bowl-like filter housing 28 enclosing a filter or cartridge element 29 is threadedly engageable upon the lower end of the body 17. The filter element 29 generally comprises a tandem spool-like frame member 30 having an axial passage 31. Generally centrally of frame member 30 the passage 31 is intercepted by a radially extending through bore 32. The cylindrical expanse between the remote flanges 33 of the frame member 30 is covered by a cylindrically disposed filter screen 34. The screen 34 is secured at the respective ends of the spool-like member 30 by an O-ring 35 that sandwiches the ends of the screen into corresponding circumferential grooves 36 provided in the respective remote flanges 33. Relative to the spool-like member 30, the screen 34 forms a pair or axially spaced annular chambers 37 between the generally central circumferentially spaced radial projections 38 and the respective remote flanges 33 and which communicate with the axial passage 31 by way of the through bore 32. The outer surface on projections 38 are generally on the same radius as the outer surfaces on the flanges 33 so that the projections provide radial support for the screen 34 intermediate the flanges. Since the filter element 29 is generally symmetrical relative to a radial plane through its center, either end may be inserted into the housing 28 to preclude possibility for error.

In assembled relation, the filter element 29 rests on the floor 39 and is disposed centrally of the filter chamber 40 formed between the housing 28 and the enlarged bore portion 21 of the body 17. The filter element 29 is axially aligned with the tubular member 20, and upon threading the housing 28 onto the body 17 the filter element engages with the lower end of the tubular member to place the passage 24 interiorly of the tubular member in flow communication with filter passage 31. As the threading of housing 28 on the valve body 17 progresses, the filter element 29 pushes the tubular member 20 against the bias of the coil spring 26 toward closure engagement with the valve seat 14. Threaded engagement for the filter housing 28 is complete when the cap 22 on the end of the tubular member 20 engages into and effects closure with the valve seat 14 to preclude all flow between the inlet passage 12 and the outlet passage 13. With the tubular member 20 forced into closure position with the valve seat 14, the radial orifices 23 are exposed and placed in flow communication with the inlet passage 12 as generally shown in FIG. 1. In the filter assembly 10 as shown in FIG. 1, flow from the inlet passage 12 is directed interiorly of the filter element 29 to the passage 31. From the passage 31, flow continues through the generally central cross bore 32 into the annular chambers 37 and outwardly through the filter screen 34. Where the flow medium is oil lubricant for a vacuum pump, not shown, three (3) outlet passages 41 from the filter chamber 40 are generally required for delivery of the filtered lubricant. Since the outlet passages 41 open from the upper portion of the filter chamber 40 above the filter element 29, even smaller particulate matter able to pass through the filter screen 34 will be afforded an opportunity to settle out to the bottom of the chamber.

The tandem spool-like frame 30 of the filter element 29 may be made of a suitable plastic such as polyethylene. The filter screen 34 may be made from stainless steel wire cloth with weave of desired wire fineness and mesh opening. FIGS. 4a through 4f generally illustrate the method of assembling the filter screen 34 onto the tandam spool-like frame member 30.

The wire cloth for the filter screen 34 is initially cut generally to the length of spool-like frame member 30. The cut strip of cloth is then rolled up to provide the strip with a generally natural cylinder forming curl. The strip of wire cloth is then cut into lengths that correspond generally to the circumference of the screen 34. According to FIG. 4a, a length 42 of the wire cloth strip is placed on a generally cylindrical fixture 43. The cylindrical periphery of the fixture 43 is interrupted by a recess 44 that extends axially over the length of the fixture and the respective ends of length 42 of the wire cloth strip are brought together over the recess and welded together along the seam 45, as generally shown in FIG. 4b, to form the generally cylindrical filter screen 34. After the welded screen 34 is removed from the fixture 43 it is ready for disposition on the spool-like frame member 30. As generally shown in FIG. 4c, a generally conical fixture 46 is disposed on an end of the spool-like member 30 and serves to bring the flexible wire cloth screen 34 into concentricity with and guide the wire cloth into position on the spool-like member. Thereafter, O-ring 35 having an outside diameter corresponding generally to the outside diameter of the flanges 33 are stretched and disposed over the screen 34 in radial alignment with the grooves 36 in the periphery of the remote flanges 33. With the O-rings 35 in place over the filter screen 34, the filter element is rolled back-and-forth over a flat surface, as generally shown in FIG. 4e, to work the respective O-rings and the screen therebeneath into the corresponding grooves and thereby secure the filter screen relative to the spool-like frame member 30.

From time to time the filter element 29 requires replacement and any sediment collected in the bowl-like housing 28 requires cleansing. To effect such replacement and/or cleansing, the housing 28 is unthreaded from the body 17. With removal of the housing 28 and filter element 29 from the assembly 10, the coil spring 26 is free to bias the tubular member 20 downwardly to engage the lower shoulder 47 on the cap 22 against the end surface 48 of the body 17 and thus effect a closure of the orifices 23 within the bore portion 19 to thereby shut-off the flow communication from the inlet passage 12 into the tubular member.

When the filter assembly 10 is in the supply line for a vacuum pump or other machine, not shown, and replacement of the filter element 29 and/or cleansing of the housing 28 is necessary or desired while such machine is running, it may be important that the flow of lubricant to such machines not be interrupted during the period for removal of the filter housing. As perhaps best shown in FIG. 2, the movement of the tubular member 20 to preclude flow therethrough, simultaneously unseats the valve member cap 22 from the valve seat 14 to place the inlet passage 12 in flow communication with the outlet passage 13. Thus, upon removal of housing 28 from the assembly 10 for cleansing of the housing and/or replacement of the filter element 29, generally contemplated to require but a relatively short interval of time, at least a flow of unfiltered lubricant will be available for that interval to preclude any need for machine shut-down. After the bowl-like housing 28 has been cleansed and/or the filter element 29 replaced, the housing may be threadedly re-engaged on the body 17 in the manner shown in FIG. 1 to resume the delivery of filtered lubricant.

Various modes of carrying out the invention are comtemplated as being within the scope of the following claims and particularly pointing out and distinctly claiming the subject matter which is regarded as the invention.

I claim:

1. In a filter assembly having a flow passage with an inlet and a first outlet, a removable housing on said assembly and defining a filter chamber having a second outlet, a filter element disposed in the chamber, said assembly having a bore extending between the flow passage and filter chamber, a tubular member slidably disposed in the bore and projecting into the flow passage and filter chamber, respectively, closure means on the end of the tubular member disposed in the flow passage, a valve seat is said flow passage, said closure means being engageable with the valve seat in a first position of the tubular member to preclude flow communication between the inlet and first outlet, said tubular member having orifice means adjacent to said closure means to place the inlet in flow communication with the second outlet through said tubular member and filter element when the tubular member is in said first position, said filter element engaging with the tubular member to maintain said member in said first position when the filter housing is in place on the assembly, and spring means to bias the tubular member from said first position to a second position upon removal of the filter housing and filter element from the assembly, said biasing movement of the tubular member to the second position effecting a separation of the closure means from the valve seat to place the inlet in flow communication with the first outlet while simultaneously effecting closure of the orifice means within the tubular member bore to shut off the flow communication to the disassembled filter housing.

2. The structure as set forth in claim 1 wherein the filter chamber is spaced beneath the inlet passage and the tubular member is disposed generally vertically, and wherein the outlet for the filter chamber is spaced from the bottom of said chamber such that particulate matter passing through the filter element can settle out to the bottom of the chamber.

3. The structure as set forth in claim 1 wherein the outlet from the filter chamber is disposed in a plane above the filter element.

4. The structure as set forth in claim 1 wherein the filter element comprises a spool-like frame member having a circumferential flange adjacent to each remote end thereof and a bore passage extending generally axially thereof, said frame member further having a radially extending bore passage intermediate the ends of the member in flow communication with the axial bore passage, the flanges on said frame member being provided with a circumferential recess that opens radially outward, a cylindrical screen of desired mesh disposed on the spool-like frame member and extending generally the full length between the remote ends thereof, an O-ring disposed outwardly of the screen and in each flange recess to secure the screen relative to the respective ends of the frame member, said filter element being disposed in the filter chamber in axial alignment with the tubular member and with one end thereof seated on the floor of the housing and the other end thereof engaged with the tubular member to thus provide for flow communication into the axial bore of the filter element and outwardly through the screen to the filter chamber outlet when said filter housing is in place on the assembly.

* * * * *